Sept. 20, 1960 W. R. HALL 2,953,033
ADJUSTABLE MULTIPLE V-BELT PULLEY CONTROL MECHANISM
Filed March 23, 1956 4 Sheets-Sheet 1

Fig. 1

INVENTOR.
WILLIAM R. HALL
BY
ATTORNEY

Sept. 20, 1960 W. R. HALL 2,953,033
ADJUSTABLE MULTIPLE V-BELT PULLEY CONTROL MECHANISM
Filed March 23, 1956 4 Sheets-Sheet 3

Fig. 3

INVENTOR.
WILLIAM R. HALL
BY
ATTORNEY

Sept. 20, 1960          W. R. HALL          2,953,033

ADJUSTABLE MULTIPLE V-BELT PULLEY CONTROL MECHANISM

Filed March 23, 1956          4 Sheets-Sheet 4

INVENTOR.
WILLIAM R. HALL
BY
ATTORNEY

UNITED STATES PATENT OFFICE 2,953,033
Patented Sept. 20, 1960

2,953,033

ADJUSTABLE MULTIPLE V-BELT PULLEY CONTROL MECHANISM

William R. Hall, 1461 Shore Parkway, Apt. 1G, Brooklyn 14, N.Y.

Filed Mar. 23, 1956, Ser. No. 573,443

8 Claims. (Cl. 74—230.17)

This invention relates to V-belt pulley drives and is particularly directed to an adjustable multiple V-belt pulley apparatus, which is mounted between the motor drive and the machine shaft pulleys in order to vary the speed range between the motor drive and the driven or machine mounted pulleys.

A primary feature of applicant's apparatus is that the pitch diameter of the adjustable pulleys at the point at which they engage the respective V-belts is varied while maintaining the center of the grooves between the angular surfaces of the cross-section of the V-belt, in alignment with those of the motor drive and the machine shaft pulleys respectively, so that the V-belts are centered and maintained in alignment with the grooves in the solid motor drive pulleys and the machine shaft pulleys at all times.

Another feature of the invention is that the sections forming the individual pulleys in the apparatus are positively located and retained in their adjusted positions, no flexible members being employed in effecting the adjustment of the V-belt groove widths.

Another feature of the apparatus is that the diameters of the various adjustable pulleys can be changed and the speed adjustments made while the machine is running without otherwise affecting the operation of the machine or the motor driving it in any manner.

A major feature of the construction is that the control wheel, employed for manually effecting the adjustment of the respective pulley section positions and for regulating the speed variations of the V-belts is located in front of the operator, when the apparatus is mounted on a machine tool or other type of machine, thus facilitating the speed adjustment without otherwise disturbing the operation of the machine.

Another advantage of applicant's apparatus is that the adjustable motor base, normally required with machine drive mountings, is eliminated.

Another feature of the construction is that the center of the drive motor may be placed in any angular position relative to the adjustable pulley mechanism, within a range of an arc of approximately 180°, the only requirement being that the center distance between the motor drive pulley and the adjustable machine drive pulleys and the machine shaft pulley respectively, necessary to maintain the required belt tension be retained.

The accompanying drawings, illustrative of one embodiment of my invention, and several modifications thereof, together with the description of their construction and the method of operation, regulation and utilization thereof, will serve to clarify further objects and advantages of my invention.

It will be understood that the following description of the construction and operation of the adjustable multiple V-belt pulley control mechanism is intended as explanatory of the invention and not restrictive thereof.

In the drawings, the same reference numerals designate the same parts throughout the various views, except where otherwise indicated.

Figure 1:
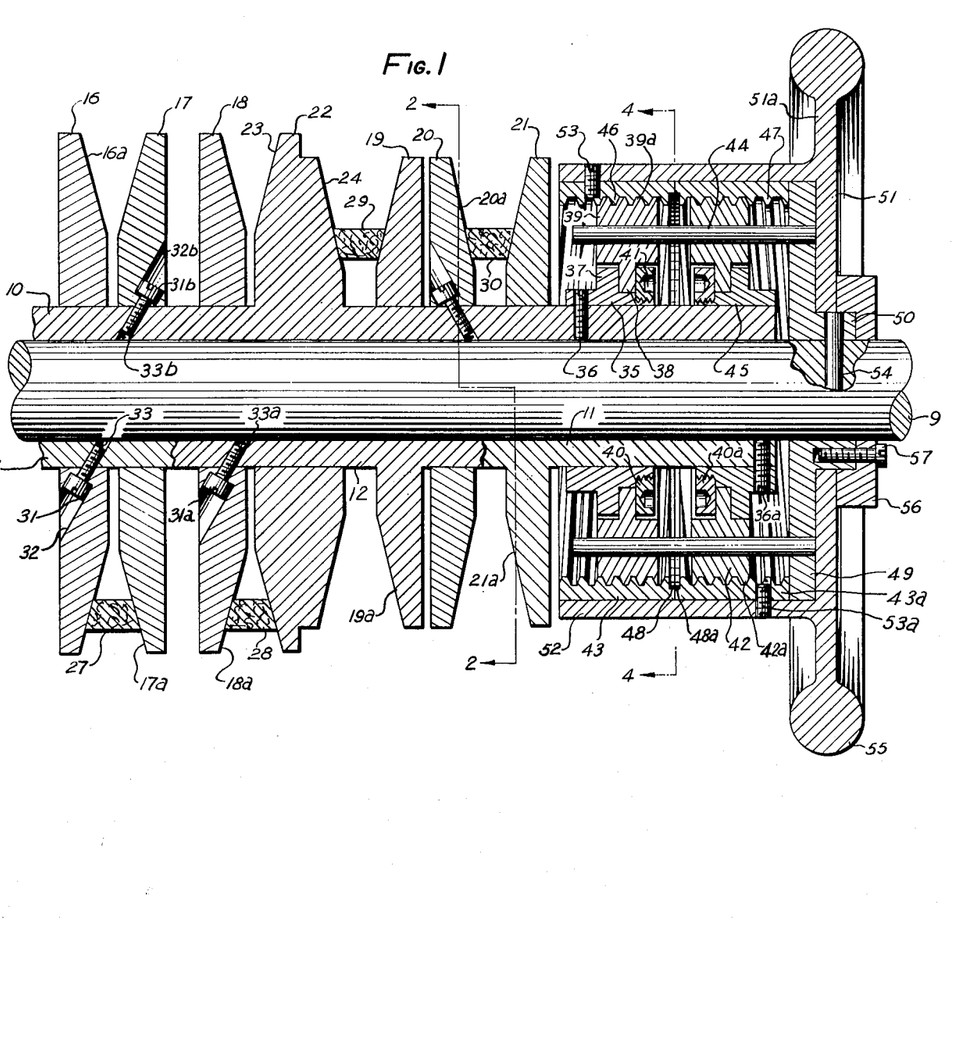
Fig. 1 is a vertical section through one embodiment of the multiple V-belt pulley control mechanism, showing one pair of adjustable pulleys adjusted to support the driving V-belt from the motor in one operating position and the other pair of adjustable pulleys to support the V-belt used for driving the driven pulleys on the machine shaft in a corresponding position, the externally threaded control sleeves, or spiders, and the splines attached to the individual pulley sections being located in the corresponding adjusted position, also showing the control wheel and the tubular control member taken on the line 1—1, Fig. 4.
Figures 2, 4:
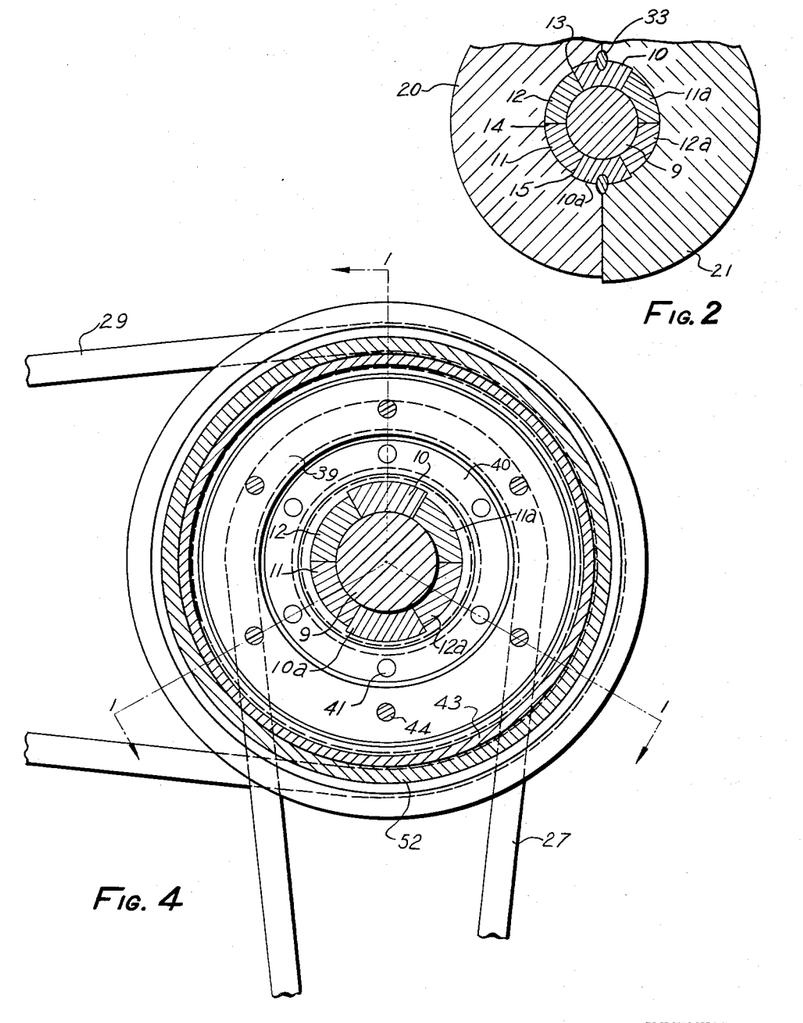
Fig. 2 is a cross-section through two of the adjustable pulley sections, shown in Fig. 1, showing the tubular sleeve splines which support the individual pulley sections, and the screws attaching the pulley sections to the corresponding splines, taken on the line 2—2, Fig. 1.
Fig. 4 is a cross-section through the control mechanism shown in Fig. 1, showing the externally threaded control sleeves, the pins slidably supporting them, and the tubular nut utilized to retain each control sleeve against the sliding collar, taken on the line 4—4, Fig. 1.
Figure 3:
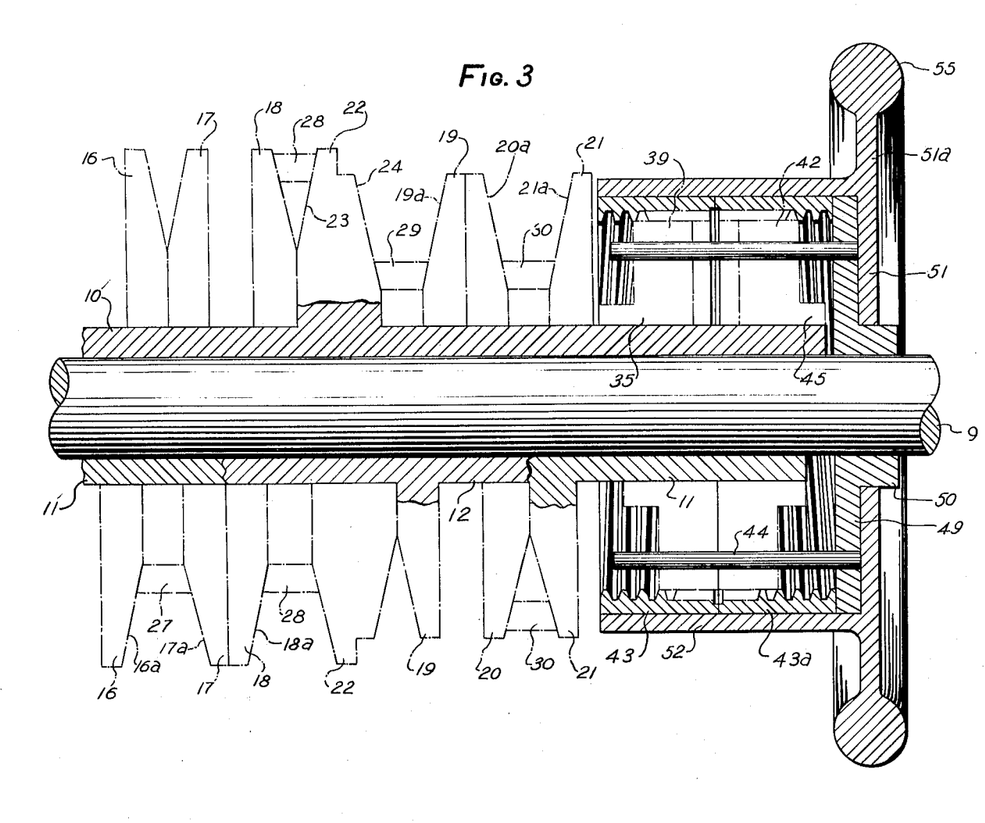
Fig. 3 is a vertical section similar to Fig. 1, through the pulley adjusting mechanism, with the pulley sections shown in dot-dash lines, above the longitudinal center line of the shaft, located in one extreme operating position so that the left-hand or forward pulley sections abut one another, the pulley sections below the horizontal center line being moved to the opposite extreme positions, with the pairs of right-hand or rear pulley sections abutting one another, so that the V-belt grooves are in their narrowest position, the tubular sleeves, or spiders being shown moved to corresponding positions above and below the center line.
Figure 5:
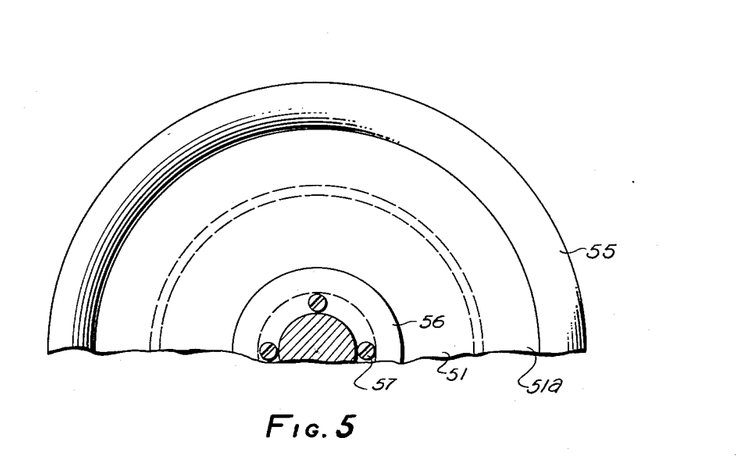
Fig. 5 is a right-hand side elevation of the pulley control mechanism shown in Fig. 1, showing the control wheel, the cupped flange employed to clamp the control wheel and the drum to the inner plate, and the screws attaching the cupped flange to the inner plate.

One embodiment of the construction, shown in Figs. 1, 2 and 3 is supported by a substantially cylindrical fixed shaft 9, having a tubular spline member consisting of a plurality of pairs of diametrically opposite radially positioned splines rotatably fitted thereto, the tubular spline member being divided into three pairs of diametrically opposite spline sections 10, 10a, 11, 11a, and 12, 12a by a set of three radially positioned diagonal slits 13, 14 and 15 which are cut through the spline member in planes located at angles of approximately 60° to one another through the longitudinal axis thereof.

A set of three pulley sections 16, 17 and 18 is supported adjacent the outer end of the spline members, left-hand, Fig. 1, and a corresponding set of three pulley sections 19, 20 and 21, mounted on the opposite end of the projecting portion of the spline members, right-hand, Fig. 1, the inner pulley section 21 being located adjacent the pulley adjusting mechanism drum.

As shown in Fig. 4, the pulley aligning splines 10 and 10a the center of which are shown in a vertical plane through the longitudinal axis of the shaft 9 are of a larger diameter than the other two pair of angularly positioned splines 11 and 12, the larger diameter splines 10 and 10a serving as a means of aligning the pulley sections relative to the splines.

As shown in Figs. 1 and 3, the central pulley section 22 is integral with the enlarged diameter pulley aligning splines 10 and 10a, the other pulley sections being attached to the splines in a manner hereinafter described in greater detail.

The pulley section 19 which adjoins the central pulley section 22, is integral with one of the pairs of splines 12 and 12a one radially located face of each of which abuts one face of one larger diameter spline, as shown in Fig. 1, another one of the pulley sections 21 which is located adjacent the drum 52 being integral with the other pair of splines 11 and 11a, one radially located face of each of which abuts the face of one larger diameter spline, opposite the face adjoining splines 12 and 12a.

As the two pair of splines 11 and 12 which are angularly positioned relative to the larger diameter pulley aligning splines, and to which the pulley sections 19 and 21 are attached move in the same direction, they are fixedly connected at the inner end thereof, within the drum 52, and function substantially as a unit in controlling the movement of the pulley sections in the manner hereinafter described. The two splines 11 and 12 and 11a and 12a, which adjoin one another at substantially the horizontal axis of the unit, which function in unison with one another may be integral with one another, or pinned, or otherwise attached to one another, in place of the individual splines shown in Figs. 2 and 4. With this type of construction manufacturing problems may dictate attaching pulley sections 19 and 21 to the respective splines by means of screws, or other suitable attaching means, instead of making them integral with the respective splines, as shown in Fig. 1, and hereinafter described.

The central double-faced pulley section 22 is mounted between the two sets of pulley sections, the central pulley section having a pair of frusto-conical sloping surfaces 23 and 24 at opposite sides thereof, the sloping surfaces forming the sides of the V-belt grooves in a manner hereinafter described in detail.

Figure 6:
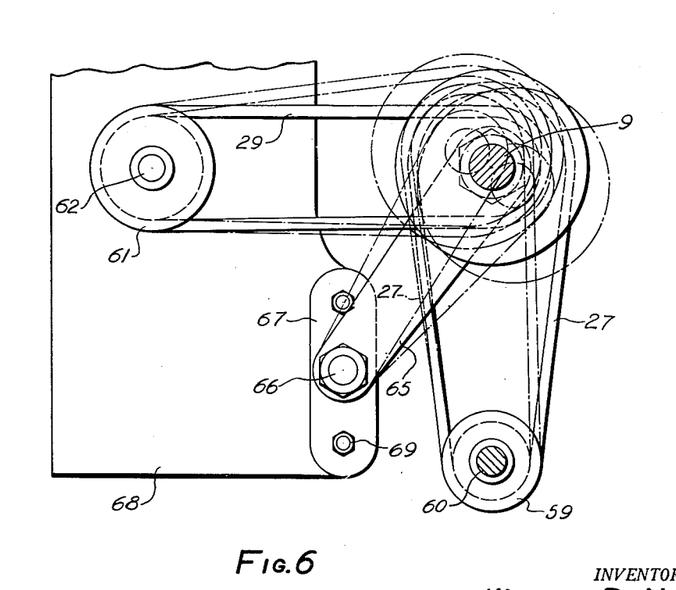
Fig. 6 is a schematic front elevation of the adjustable pulley control mechanism mounted in its operating position, showing the motor drive pulley connected by V-belts to one set of adjustable pulleys, and the machine shaft pulley connected by another set of V-belts to the other pair of adjustable pulleys, both the driving and driven V-belts being shown moved to another adjusted position in dot-dash lines.

Each of the outer pair of pulley sections 16 and 17, has a sloping frusto-conical surface 16a, 17a, on one side thereof, the two sloping surfaces facing one another to form a V-groove into which a motor driven V-belt 27 is fitted in a manner shown in greater detail at the bottom of Fig. 6, the angle of each of the sloping surfaces relative to the face of each of the pulley sections corresponding to the angle formed by the side of the driven V-belt section relative to the axis therethrough, thus enabling each pair of pulley sections to engage and drive the sloping faces of the V-belt.

Similarly, the third left-hand pulley section 18 has a sloping surface 18a formed on the inner face thereof, adjacent the outer circumference of the pulley section, the sloping surface 18a of the pulley section co-acting with the outer sloping surface 23 of the central pulley section 22 to engage a second driven V-belt 28, as shown in greater detail in Fig. 3.

In the same manner, the outer pulley section 19 of the right-hand set of pulley sections, has a sloping surface 19a formed on the outer face thereof, around the outer circumference of the pulley section, the angle of the slope of the sloping surface 19a and the inner and outer diameter thereof being substantially equal to the corresponding sloping surface 24 of the central pulley section 22 to enable the two sloping surfaces to engage and drive the sloping sides of a machine drive V-belt 29, as shown in detail at the left-hand side of Fig. 6.

The two mating sloping surfaces 16a and 17a of the outer pulley sections 16 and 17, are substantially equal in slope and inner and outer diameter to the mating sloping surfaces 18a of the third outer pulley section 18 and the mating sloping surface 23 of the central pulley section 22 respectively, so that the two driven V-belts 27 and 28 are located and retained at substantially the same distance from the longitudinal axis of the central shaft 9, assuming equal spacing between corresponding pulley sections, thus enabling the driven V-belts 27 and 28 to co-operate in driving the two pairs of pulley sections 16, 17 and 18, 22 respectively at the same speed.

In the same manner, the two inner pulley sections 20 and 21 of the right-hand pair each has a mating sloping surface 20a and 21a formed around the outer circumference of the adjoining face thereof, the two mating sloping surfaces 20a and 21a engaging and driving the second machine drive V-belt 30.

The diameter of the corresponding sloping surfaces of the central pulley section 22 and the outer right-hand pulley section 19 and the two inner right-hand pulley sections 20 and 21 are substantially equal, so that the pitch diameter of the two V-belt grooves which engage the machine drive V-belts are substantially equal to one another, assuming equal spacing between each pair of pulley sections, thus retaining the section of each machine drive V-belt 29 and 30 at the same radial distance from the longitudinal axis of the central shaft, so that both machine drive V-belts 29 and 30 are driven at substantially the same speed by the two machine drive pulley grooves.

As shown in Fig. 1, the one outer pulley section 17, and one of the inner pulley sections 20, which move in coordination with the central pulley section 22, are fixedly attached to the larger diameter pulley aligning pair of splines 10 and 10a by individual screws 31, the head of each of which is supported and guided by a counterbore 32b formed through the pulley section at an angle to the longitudinal axis thereof, each screw having an externally threaded body 33b, which is threadably fitted to a mating opening in one of the splines 10 or 10a.

The outer pulley section 16, mounted at the outer end of the central shaft, is fixedly attached to the angularly positioned diametrically opposite pair of splines 11 and 11a which are angularly positioned relative to the larger diameter pulley aligning splines, by individual screws 31, each of which consists of a cylindrical head fitted to an angularly positioned circular counterbore 32 in the pulley section 16, each screw having an integral externally threaded body 33, which is threadably fitted to a mating opening in each of the splines 11 and 11a. The outer pulley section 16, which is attached to the two spline sections 11 and 11a with which the inner pulley section 21 is integral, is moved simultaneously therewith into the adjusted positions shown in Fig. 3, and hereinafter described in greater detail.

In the same manner, the outer pulley section 18, which is mounted adjacent the central pulley section 22, is attached to the pair of splines 12, 12a with which the inner pulley section 19 is integral, the splines being angularly positioned relative to the larger diameter pulley aligning splines, the two pulley sections 18 and 19 being moved in unison into the adjusted position shown in Fig. 3 and hereinafter described in greater detail. The pulley section 18 is attached to the splines 12 and 12a by means of angularly positioned screws 31a, each of which has an externally threaded body 33a, which is threadably fitted to a mating opening in one of the angularly positioned splines 12 or 12a. Instead of referring to the pulley sections, such as 22, 17 and 20, and 16, 18, 19 and 21, which function and move in unison, in the manner hereinbefore described in the specifications, they can be referred to as groups of pulley sections, the groups of pulley sections functioning in unison, in the manner hereinafter described.

Each of the pulley sections 16, 18, 19, and 21 which is not attached to the larger diameter pulley aligning splines 10 and 10a has a pair of diametrically opposite enlarged openings therethrough to clear the larger diameter pulley aligning splines 10 and 10a, as shown in Fig. 4.

The method of attaching the various pulley sections to the corresponding spline sections shown in Figs. 1, 2 and 4 is as follows:

As shown in Fig. 1, the central or double-faced pulley section 22 is integral with the larger diameter spline sections 10 and 10a.

Starting at the left-hand end of Fig. 1, opposite the wall 51, the first pulley section 16, is attached to one angularly positioned pair of splines 11, 11a by a screw 31.

The second pulley section 17 is attached to one of the enlarged pulley aligning pair of splines 10, 10a, by a screw 31b.

This pulley section 17 is grouped with the central pulley section 22 and moves in unison therewith, during the adjustment procedure shown in Figs. 1 and 3, and hereinafter described in detail.

The pulley section 18, which is located adjacent the left-hand face of the central pulley section 22, is attached to one of the pair of angularly positioned splines 12, 12a shown in Fig. 2, by a screw 31a.

As the splines 11, 11a and 12, 12a move in unison during the adjust-period, shown in Figs. 1 and 3, this pulley section moves in unison with pulley section 16.

Going to the right-hand side of the central pulley section 22, the adjoining pulley section 19 is integral with one of the angularly positioned splines 12, 12a.

The next pulley section 20 is fixedly attached to one of the enlarged pulley aligning spline sections 10, 10a by means of a screw 3.

This pulley section therefore functions in the same manner as the central pulley section 22, and the left-hand pulley section 17, all of which are attached to one of the enlarged pulley aligning splines 10, 10a, these pulley sections moving in unison during the adjustment operation shown in Fig. 3.

The extreme right-hand pulley section 21, which is closest to the open face of the drum 52 is integral with one of the angularly positioned splines 11, 11a.

As both the spline sections 11, 11a, and 12, 12a move in unison during the belt groove adjustment operation, shown in Fig. 3, and hereinafter described, all of the pulley sections which are attached to or integral with one or the other pair of splines 11, 11a, 12, 12a, move in unison during the adjustment operation, as shown in Fig. 3.

With a total of seven pulley sections including the central pulley section 22, these pulley sections may be grouped as follows according to the spline section or a pair of spline sections to which each group of pulley sections it attached, or with which it is aligned.

The central pulley section 22 is integral with one of the enlarged pulley aligning splines 10, 10a, the two pulley sections which function in unison with it are pulley sections 17 and 20, both of which are attached to the same pair of splines 10, 10a. As these spline sections move in unison relative to the angularly positioned spline sections 11, 11a, 12, 12a when they are moved in either direction in the manner hereinbefore described, this constitutes one group of pulley sections.

The second group of pulley sections consists of four pulley sections, all of which are either integral with, or attached to one of the pairs of angularly positioned splines 11, 11a, 12, 12a.

This includes pulley sections 16 and 18, located at one side of the central pulley section 22, which are attached to the spline sections 11, 11a, 12, 12a by screws.

Of the pulley sections located to the right-hand side of the central pulley sections 22, one 19 is integral with one pair of splines 12, 12a, the second pulley section 21, being integral with one of the second pair of splines 11, 11a.

As both splines 11, 11a, 12, 12a move in unison, the four pulley sections in this group 16, 18, 19, 21, which are either integral with, or attached to these splines, function in unison and therefore form a second group of pulley sections.

A substantially tubular shouldered collar 35 is attached to the larger diameter pulley aligning pair of splines 10 and 10a by a set screw 36, or other suitable attaching means, as indicated in Fig. 1. The outer portion of the collar has a substantially circular flange 37 integral therewith, the flange engaging one face of the internal flange 38 of an externally threaded sleeve or spider, which surrounds the collar 35 in the position shown in Fig. 1. The internal flange of the sleeve 39 is held adjacent the collar 35 by a substantially circular internally threaded lock nut 40, which is threadably fitted to the reduced diameter central portion of the collar. The nut is rotated by a plurality of pairs of diametrically opposite spanner holes 41, to which a spanner wrench (not shown) may be fitted.

The externally threaded sleeve 39 and the mating sleeve 42, located at the opposite end of an internally threaded control member 43 and 43a in which the sleeves 39 and 42 are mounted, are slidably supported by a plurality of radially positioned pins 44 located substantially parallel to the longitudinal axis of the central shaft 9 and radially located therefrom.

A mating shouldered collar 45 is fixedly attached to the two pair of splines 11, 11a, and 12, 12a which are angularly positioned relative to the larger diameter pulley aligning splines, by a plurality of set screws 36a, which are threadably inserted in the splines, the rear collar 45 and the set screws 36a causing the two splines 11, 11a and 12, 12a which are angularly positioned relative to the larger diameter pulley aligning splines to function as a unit, the collar being located adjacent the inner edge of the splines 11 and 12. The externally threaded sleeve is rotatably supported against the collar 45 in the same manner as the outer sleeve 39, a lock nut 40a threadably fitted to the reduced diameter end of the collar being provided to grip the inner flange of the externally threaded sleeve 42 in the same manner.

The collar 45 has a pair of diametrically opposite circular segmental shaped openings, such as those shown in Fig. 4 therethrough, to clear the larger outside diameter of the pulley aligning splines 10 and 10a.

A substantially tubular control member which is formed in two sections, a left-hand section 43 and a right-hand section 43a surrounds the two externally threaded sleeves 39 and 42.

The left-hand section 43 of the control member has right-hand acme, or other form of internal threads 46 formed therein, conforming to the right-hand threads 39a of the left-hand sleeve 39. The right-hand section 43a of the control member has the same type of left-hand internal threads 47 therein conforming to the form and contour of the left-hand external threads 42a on the right-hand sleeve 42.

A pair of central recesses 48 and 48a is formed at the junction ends of the two sections 43 and 43a of the tubular control member, the central recesses 48 and 48a being of larger diameter than the threads 46 and 47, thereby serving to separate the left and right-hand internal threads.

The outer or left-hand sleeve is externally threaded 39a, the right-hand external threads being fitted to mating internal threads 46 in the left-hand section 43 of the tubular control member. Similarly, the inner or right-hand sleeve has left-hand external threads 42a around the outer circumference thereof, the threads being fitted to the left-hand internal threads formed in the inner, or right-hand section 43a of the tubular control member.

A flat circular plate 49 having a central hub 50 fitted to the central shaft 9, is mounted adjacent the right-hand end of the right-hand section 43a of the internally threaded control member, the plate abutting the rear wall 51 of the hollow cylindrical drum 52 into which the control member is fitted.

The circumferential outer wall of the hollow cylindrical drum 52 is fixedly attached to the two sections 43 and 43a of the tubular control member by a plurality of set screws 53, 53a, one set of set screws 53 being inserted in the left-hand section 43 of the control member, the other set screws 53a being fitted to the right-hand section 43a, as shown in Fig. 1.

After insertion in and attachment to the circumferential outer wall of the hollow cylindrical drum 52, the two sections 43 and 43a of the tubular control member function substantially as a single unit, as they are attached to the drum and abut one another at the center thereof.

The cylindrical pins 44 which slidably support the externally threaded sleeves 39 and 42, are pressed into, threadably attached to, or otherwise attached to the plate 49, the pins preventing rotation of the externally threaded sleeves 39 and 42 when the tubular control member is rotated.

The rear wall of the hollow cylindrical drum 52 has an extension 51 integral therewith, a rim 55 of substantially circular cross-section, integral with the rear wall extension being provided to enable the operator to manually rotate the drum 52.

A cupped flange 56 is mounted adjacent the rear wall 51 of the drum 52, the flange having a cylindrical cavity therein, which receives the hub 50 of the plate.

A plurality of radially positioned screws 57, threadably attached to the hub 50 of the plate, is provided to retain the plate in engagement with the rear wall of the hollow cylindrical drum 52, the heads of the screws engaging the outer surface of the flange 56.

The adjustment of the pulley ratios is accomplished in the following manner, as clarified by Figs. 1 and 3.

When the hollow cylindrical drum 52 with the two sections of the control member attached thereto is rotated in a clockwise direction, looking from the front or outer wall 51 end of the drum shown in Fig. 1, the right-hand threads in the tubular sleeve 39 at the open end of the hollow cylindrical drum move the left-hand sleeve 39 toward the pulley sections, the left-hand threads in the inner or right-hand section 43a of the control member simultaneously moving the right-hand sleeve 42 rearward toward the rear wall of the drum 52.

The vertical splines 10 and 10a which are attached to the left-hand shouldered collar, which supports the left-hand sleeve 39, is moved forward toward the pulley section 16 which is integral with or fixedly attached to one pair of splines 11 and 11a which are angularly positioned relative to the larger diameter pulley aligning splines, and the pulley sections 18 and 19, which are integral with, or attached to the other pair of splines 12 and 12a which are angularly positioned relative to the larger diameter pulley aligning splines which move in unison with the pulley sections 18 and 19, thereby reducing the space between the mating left-hand or driven pulley sections, and increasing the gap between the mating machine drive or right-hand pulley sections 22, 19, 20 and 21.

The left-hand threads in the inner or right-hand section 43a of the control member simultaneously move the right-hand sleeve rearward, the two pair of angularly positioned splines 11, 11a and 12, 12a, relative to the larger diameter splines both pairs of which are fixedly attached to the right-hand collar, being moved rearward from the position shown in Fig. 1, the pulley sections 16 and 21, which are integral with or fixedly attached to one pair of splines 11 and 11a, and the other pulley sections 18 and 19 which are integral with or fixedly attached to the second pair of angularly positioned splines, being moved rearward by the splines to which they are attached, both angularly positioned pairs of splines functioning in unison.

As both pairs of pulley sections of the left-hand, or driven pulleys are moved toward one another, thereby reducing the spacing between the sloping faces of the left-hand pulley sections respectively, thus reducing the groove width and forcing the V-belts 27 and 28 radially outward from the position shown in Fig. 1, to the position shown in the upper portion of Fig. 3, thereby increasing the pitch diameter of the driven pulleys at the point of engagement with the V-belts, and reducing the speed of the driven pulleys relative to the motor.

The spacing between the right-hand, or machine drive pulley sections is simultaneously increased in the same manner, the right-hand pulley sections being moved from the position shown in Fig. 1, to the upper position shown in Fig. 3, the gap between the sloping surfaces of the right-hand pulley sections being increased, thereby increasing the V-belt groove width, and moving the machine drive V-belts inward from the position shown in Fig. 1, to a position shown in the upper portion of Fig. 3, thereby decreasing the pitch diameter of the machine drive V-belts 29 and 30 and in that manner altering the ratio between the machine drive pulleys and the pulley attached to the drive shaft of the machine, and as the speed of the pulleys is reduced by the driven pulleys, reducing the speed of the machine to some extent, the actual final speed depending upon the momentary ratio between the pitch diameters of the motor pulley and the driven pulleys, and that between the machine drive pulley sections and the machine shaft pulley.

The center distance spacing between the centers of the motor pulley, and the driven pulley sections at the outer end of the adjusting mechanism, and that between the machine drive pulley sections on the inner end of the adjusting mechanism and the machine shaft pulley, is adjusted by means of a floating pivoted lever shown in Fig. 6, and hereinafter described in greater detail.

When the hollow cylindrical drum 52 is rotated in a counterclockwise direction by the operator, the right-hand internal threads in the left-hand section 43 of the control member move the left-hand sleeve rearward, the pulley sections attached thereto by means of the larger diameter pulley aligning splines 10 and 10a being moved rearward from the position shown in Fig. 1, to the position shown in the lower portion of Fig. 3.

The left-hand internal threads in the right-hand section 43a of the tubular control member simultaneously move the rear sleeve, the rear collar 45, and the pulley sections attached thereto by means of the angularly positioned pairs of splines 11, 11a and 12, 12a, forward from the position shown in Fig. 1, to the position shown in the lower portion of Fig. 3.

As the groove width of the two left-hand or driven pulleys is increased, the V-belts 27 and 28 fitted to the motor pulley are moved inward toward the shaft center, thereby reducing the pitch diameter of the driven belt, and increasing the rotational speed of the driven pulley.

The center distance between the motor pulley and the two left-hand, or driven pulleys is simultaneously increased by the floating pivot arm in order to maintain the V-belt tension substantially constant in the manner shown in Fig. 6 and hereinafter described in greater detail.

The left-hand sleeve and collar and the pulley sections attached to the collar by means of the larger diameter pulley aligning splines 10 and 10a are simultaneously moved rearward from the position shown in Fig. 1 to the position shown in the lower portion of Fig. 3, and as the gap between the mating right-hand, or machine drive pulley sections is reduced, the machine drive V-belts 29 and 30 are moved outward from the position shown in Fig. 1 to the position shown in the lower portion of Fig. 3. The center distance between the adjustable machine drive pulleys and the machine shaft pulley shown in Fig. 6 is simultaneously adjusted by means of the pivoted floating arm.

As the rotational speed of both sets of pulley sections is increased by the reduction of the pitch diameter of the driven pulley V-belts, the speed of the machine is increased, the actual speed relative to the motor speed being controlled by the momentary ratio between the motor pulley and the driven pulleys and the machine drive pulleys and the machine shaft pulleys respectively.

As the movement of each pulley section in one direction is substantially equal to the movement of the mating pulley section in the opposite direction, the relation between both sides of the V-belt groove relative to the centerline of each of the V-belts remains constant, regardless of the adjusted width of the V-belt groove.

As the center of each of the driven V-belts 27 and 28 is aligned with the mating groove in the motor drive pulley, the driven pulley sections are retained in accurate alignment with the motor drive pulley regardless of the adjusted position of the driven pulley sections and the pitch diameter of the driven pulley V-belts.

In the same manner, the right-hand, or machine drive pulley sections 20 and 21 are moved toward or away from one another through the same distance, thereby retaining the relation between the sloping faces of the machine drive pulley sections 20 and 21 and the machine drive V-belts 29 and 30 regardless of the adjusted pitch diameter of the machine drive V-belts.

As the machine drive V-belts are accurately centered between the sloping faces thereof relative to the driven pulley of the machine, the V-belt centering relation is retained at all times regardless of the adjusted pitch diameter of the machine drive pulley sections.

As both the motor driven and the machine drive V-belts are accurately centered relative to the sloping faces of the mating pulley sections, the belt tension is held uniform on both sides of the V-belt, thereby improving the efficiency of the belt, and providing for uniform wear on both sides of the V-belt.

As the tubular control member 43 is held stationary at all times, except when rotated by the operator, in order to adjust the width of the pulley grooves, the adjusting wheel rim may be safely rotated by the operator in order to adjust the ratio between the motor and the machine, while the machine is in operation.

While the pairs of splines 10, 10a, 11, 11a and 12, 12a, and the shouldered collars 35 and 45 attached thereto are constantly in rotation while the motor and the machine are in operation, the rotation of the collars is not transmitted to the externally threaded sleeves 39 and 42.

In the mounted position shown in Fig. 6, a motor pulley 59 is mounted on a motor shaft 60, below and in substantially vertical alignment with the axis of the central shaft of the adjustable unit shown in Figs. 1, 2 and 3.

This motor pulley 59 is connected to the driven pulley sections, shown in Figs. 1 and 3, by one or more V-belts 27 and 28 as shown in Fig. 6.

A machine shaft pulley 61 is mounted to the left of and in substantially horizontal alignment with the axis of the central shaft 9, the pulley being supported by a shaft 62, which is mounted to the left of and in substantially horizontal alignment with the axis of the central shaft. The machine shaft pulley 61 is connected to and driven by a plurality of V-belts 29 and 30 which are driven by the machine drive pulleys in the positions shown in Fig. 1.

When the spacing between mating pulley sections is increased, as shown in the lower portion of Fig. 3, in order to increase the spacing between the sloping faces of the mating pulley sections, the pitch diameter of the V-belt of the motor driven pulley is reduced, the driven V-belt assumming a position substantially as shown by dot-dash lines at the bottom of Fig. 6.

Simultaneously, the machine drive pulley sections 20 and 21 are moved closer to one another, thereby reducing the gap between the sloping faces of the machine drive pulley sections, as shown in Fig. 3.

The pitch diameter of the V-belt 29 in engagement with the machine shaft pulley 61 is increased, the machine drive V-belts assuming a position substantially as shown by dot-dash lines in the upper portion of Fig. 6.

The central shaft 9 of the adjusting mechanism is supported by the outer end of a floating pivoted arm 65, the lower end of which is pivotally supported by a pin or bolt 66 which is in turn supported by a substantially vertical bracket 67, which is attached to the machine 68 by a plurality of bolts 69, or other suitable attaching means.

In the operating position shown in Fig. 1, the pivoted floating arm 65 is angularly disposed to the vertical axis of the machine bracket 67 in substantially the position shown by solid lines, Fig. 6.

When the machine drive pulley sections are moved to the adjusted position shown by dot-dash lines in the lower right hand portion of Fig. 3, the pitch diameter of the machine drive V-belt 29 is increased to the position shown by dot-dash lines, Fig. 6. In this position, the pivoted floating arm 65 is moved angularly leftward, thereby reducing the center distance between the machine shaft pulley 61 and the machine drive adjustable pulleys, and maintaining constant tension in the V-belts 29 and 30.

At the same time the center distance between the motor pulley 59 and the adjustable motor driven pulleys is increased to compensate for the reduced pitch diameter of the motor driven pulleys, as shown in the left-hand lower portion of Fig. 3.

Conversely, when the pitch diameter of the adjustable machine drive pulleys is reduced, with the pulleys assuming the position shown in the upper portion of the right-hand side of Fig. 3, the floating pivot arm is moved angularly rightward to the position shown by dot-dash lines, Fig. 6, thereby increasing the center distance between the machine shaft pulley 61 and the adjustable machine drive pulleys, the center distance between the motor pulley 59 and the central shaft of the adjustable unit being correspondingly reduced to maintain substantially constant tension in both sets of V-belts.

While the center of the motor shaft is shown substantially in line with the axis of the central shaft 9 of the adjusting mechanism, the motor shaft 60 may be located at any angle within an arc of approximately 90° relative to the central shaft of the adjusting mechanism.

In this relation the pivoted floating arm, which supports the adjusting mechanism central shaft, would be moved from the position shown in Fig. 6, in order to enable it to adjust the center distance between the motor pulley and the motor driven pulleys mounted on the adjusting mechanism.

Similarly, the machine shaft pulley 61 may be moved through an arc of approximately 90° relative to adjustment mechanism central shaft 9 from the position shown at the left-hand side of Fig. 6. When the machine shaft pulley is moved, the point at which the pivoted floating arm is mounted, and the pivoted floating arm itself would be altered from the position shown in Fig. 6, in order to enable it to adjust the center distance between the adjustable machine drive pulleys and the machine shaft pulley, when the V-belt pitch diameter is adjusted in order to obtain the required machine drive belt tension.

The center distances between the motor pulley and the central shaft of the adjusting mechanism may be varied to control the belt tension when the pitch diameter of the motor driven V-belt 27 is varied by means of the pivoted floating arm construction shown in Fig. 6, or by other suitable adjusting means. At the same time the center distance between the machine shaft pulley and the machine drive pulleys of the adjusting mechanism would be varied by either a pivoted floating arm, such as that shown in Fig. 6, or by other suitable means, in order to adjust the machine drive belt tension to compensate for variations in the machine drive pulley adjusted pitch diameter.

While two pairs of pulley sections are shown on the motor driven side of the unit, driving two motor driven V-belts, and similarly two pairs of pulley sections are shown on the machine drive side driving two machine drive V-belts, the number of pairs of pulley sections and consequently the number of V-belts utilized may be increased to three or more depending upon the requirements of a particular drive.

The diameters of the pulley sections may be made to any required diameter, the diameters of the frusto-conical surfaces on each of the pulley sections being increased or decreased to obtain the required range of V-belt pitch diameters.

Thus the motor driven pulley sections may be considerably larger or smaller in diameter than that of the machine drive pulley sections to obtain the required range of V-belt pitch diameters between the motor driven V-belts and the machine drive V-belts.

The method of supporting the tubular collars on the spline sleeve, and the method of attaching the tubular collars to the respective pairs of splines may be varied to suit the requirements of a particular application.

The method of supporting the externally threaded sleeves on the shouldered tubular collars may be varied, the relation between the externally threaded sleeves and the mating collars individually attached to the mating pairs of splines being altered to suit the specific requirements of an installation.

The cylindrical rods fitted to the externally threaded sleeves, in order to prevent rotation of the sleeves while permitting them to slide longitudinally, may be varied in number and in the method of supporting them as long as the essential factor is maintained, that the rods are held stationary relative to the fixed cylindrical shaft, and that the rotation of the externally threaded sleeves is restrained, while the collars which individually support them are rotated by the mating pairs of pulley sections, through the splines.

While three pairs of diametrically opposite splines are shown in the drawings, the number of pairs of splines may be increased, or reduced, depending upon the number of belts employed on each drive, the essentials of the other features of the construction and the method of operation of the unit remaining substantially the same.

It will be apparent to those skilled in the art that my present invention is not limited to the specific details described above and shown in the drawings, and that various modifications are possible in carrying out the features of the invention and the operation, actuation, and method of mounting and utilization thereof, without departing from the spirit and scope of the appended claims.

I claim:

1. An adjustable V-belt pulley mechanism comprising a cylindrical shaft, a plurality of pairs of splines surrounding the shaft rotatably fitted relative to the shaft, one spline of each pair being diametrically opposite the other, the splines including a first pair of splines of larger diameter than the others, two pairs of splines being angularly positioned relative to the first pair of splines, the angularly positioned pairs of splines being attached to one another, a plurality of pairs of circular pulley sections mounted on the splines, one pulley section of each pair having a sloping frusto-conical surface around one edge thereof, the adjoining pulley section of each pair of pulley sections having a frusto-conical surface around the mating edge thereof, the sloping surfaces of each pair of pulley sections forming a V-belt pulley groove therebetween, a group consisting of three said pulley sections being fixedly attached to the first pair of splines, a second group consisting of four pulley sections having sloping surfaces co-ordinated with those of the pulley sections attached to the first pair of splines to form V-belt grooves therebetween, being fixedly attached to the angularly positioned pairs of splines, manually operated control means surrounding one end of said splines, said control means consisting of a pair of tubular collars fitted to the outer circumference of the splines, means fixedly attaching one of said tubular collars to the larger diameter pair of splines, means fixedly attaching the other tubular collar of the pair to the angularly positioned pairs of splines, a pair of externally threaded sleeves surrounding the tubular collars, each of the externally threaded sleeves being operative to slide longitudinally relative to the splines without rotating, while the mating tubular collar is rotated, a multiple-section internally threaded control member threadably fitted to the outer circumference of the sleeves, and means attached to the control member adapted to manually rotate the control member, the external threads on the sleeves being adapted to longitudinally move the collars attached to the sleeves, and the pulley sections attached to said collars, the longitudinal movement of the first pair of splines being substantially equal to the longitudinal movement of the attached angularly positioned pairs of splines, the first pair of splines and the angularly positioned pairs of splines being respectively moved in the desired direction of movement of the pulley sections selectively attached thereto, the control means being adapted to move the pulley sections respectively mounted on the splines toward and away from one another to vary the width of the V-belt grooves, the center of each of the V-belt grooves remaining substantially fixed regardless of the momentary adjusted width of the V-belt grooves.

2. An adjustable V-belt pulley mechanism comprising a cylindrical shaft, a first diametrically opposite pair of splines, and two pairs of splines angularly positioned relative to the first pair of splines, on opposite sides of the vertical axis thereof, fitted to the shaft and rotatable relative to the shaft, one spline of each angularly positioned pair being diametrically opposite the other, the two angularly positioned pairs of splines being attached to one another, a plurality of pairs of circular pulley sections mounted on the splines, one pulley section of each pair having a sloping frusto-conical surface around one edge thereof, the adjoining pulley section of each pair of pulley sections having a frusto-conical surface around the mating edge thereof, sloping in a direction opposite that of the mating pulley section of each pair, the mating sloping surfaces of each pair of pulley sections forming a V-belt pulley groove therebetween, a control mechanism fitted to the splines forward of the pulley sections attached thereto, means fixedly attaching one group of pulley sections mounted on the portion of the splines located near the control mechanism to the first pair of diametrically opposite splines, the pulley sections mounted near the control mechanism, and having sloping surfaces facing in one direction, means fixedly attaching the mating pulley sections mounted on the portion of the splines located near the control mechanism, to the angularly positioned pairs of splines, the pulley sections mounted near the control mechanism, and having sloping surfaces co-ordinated with those of the pulley sections attached to the first pair of splines to form V-belt grooves therebetween, means fixedly attaching a first group of pulley sections located a greater distance from the control mechanism, near the outer end of the splines, said pulley sections having sloping surfaces angularly opposite the first group of pulley sections located near the control mechanism, to the first pair of splines, means fixedly attaching a second group of pulley sections mounted on the portion of the splines located a greater distance from the control mechanism, near the outer end of the splines, to the angularly positioned pairs of splines, the pulley sections located a greater distance from the control mechanism, near the outer end of the splines, and having sloping surfaces sloping in a direction opposite the first group of rear mounted pulley sections, located near the outer end of the splines, the control mechanism surrounding one end of said splines, said control mechanism consisting of a pair of tubular collars fitted to the outer circumference of the splines, a pair of externally threaded sleeves surrounding the tubular collars, the direction on the threads on one of said sleeves being opposite that of the threads on the other sleeve of the pair, each of the externally threaded sleeves being attached to the mating tubular collar in such a manner as to permit the sleeve to slide longitudinally while the tubular collar attached thereto is rotated, and a multiple-section internally threaded control member fitted to the outer circumference of the sleeves, the directions of the threads on the control member corresponding to those of the mating threads on the sleeves, and means attached to the control member adapted to permit manual rotation of the control member, the external threads on the sleeves being adapted to longitudinally move the collars attached thereto and the pulley sections attached to the collars, the longitudinal movement of the first pair of splines in one direction, being substantially equal to the longitudinal movement of the angularly positioned pairs of splines in the opposite direction, the control means being adapted to simultaneously move the pulley sections mounted on the splines toward and away from one another to vary the width of the V-belt grooves co-ordinated with the longitudinal movement of the splines to which they are respectively attached, the mating pulley sections located near the open end of the cylindrical drum, being respectively moved toward one another to reduce the width of the V-belt grooves therebetween, when the mating pulley sections beyond the central pulley section, toward the free end of the splines, are moved away from one another to increase the width of the V-belt grooves therebetween, the center of each of the V-belt grooves remaining substantially constant regardless of the momentary adjusted width of the V-belt grooves between each pair of pulley sections.

3. An adjustable V-belt pulley mechanism comprising a cylindrical shaft, a plurality of splines forming a substantially tubular member fitted to the shaft and rotatable relative to the shaft, the splines consisting of one diametrically opposite pair of splines, the outer diameter of which is larger than the others, and two pairs of splines angularly positioned relative to the diametrically opposite, larger diameter pair of splines, on opposite sides of the vertical axis of the larger diameter pair of splines, one spline of each angularly positioned pair of splines being diametrically opposite the other, the angularly positioned pairs of splines and being operatively attached to one another, a plurality of pairs of circular pulley sections mounted on the tubular splines, one pulley section of each pair having a sloping frusto-conical surface around one edge thereof, the adjoining pulley section of each pair of pulley sections having a frusto-conical surface around the mating edge thereof, the sloping surfaces of each pair of pulley sections forming a V-belt groove therebetween, means fixedly attaching one group of pulley sections having sloping surfaces facing in one direction to the larger diameter pair of diametrically opposite splines, means fixedly attaching the mating pulley sections having sloping surfaces co-ordinated with those of the pulley sections attached to the larger diameter pair of splines to the angularly positioned pairs of splines to form V-belt grooves therebetween, a pair of tubular collars fitted to the outer circumference of the splines, means fixedly attaching the first of the tubular collars to the larger diameter pair of splines, means fixedly attaching the second of said tubular collars to the angularly positioned pairs of splines, an externally threaded sleeve supported by the first of said collars, the externally threaded sleeve being adapted to slide without rotating while the tubular collar is rotated, a second externally threaded sleeve supported by the second tubular collar, the second collar being adapted to rotate relative to the mating sleeve, the first sleeve having left-hand external threads around the outer circumference thereof, the second sleeve having right-hand external threads around the outer circumference thereof, a multiple section internally threaded tubular control member surrounding the outer circumference of the sleeves, the tubular control member having internal threads conforming in form and thread hand to the mating threads in the sleeves, and means attached to the tubular control member adapted to manually rotate the tubular control member, the external threads on the sleeve being adapted to move the mating pulley sections relative to one another to selectively vary the width of the V-belt grooves formed between the sloping surfaces of the adjoining pairs of pulley sections.

4. An adjustable V-belt pulley mechanism comprising a cylindrical shaft, a plurality of pairs of splines located radially around the cylindrical shaft circumference, fitted to the shaft, and rotatable relative to the shaft, one spline of each pair being diametrically opposite the other, the splines consisting of a diametrically opposite pair of splines or larger outside diameter than the others, and two pair of the splines angularly positioned relative to the larger diameter pair of splines, and located on opposite sides of the vertical axis of the larger diameter splines, the outer diameter of the larger diameter pair of splines extending radially beyond the outer diameter of the angularly positioned splines, the angularly positioned splines being operatively attached to one another, a plurality of pairs of circular pulley sections mounted on the outer circumference of the splines, a control mechanism fitted to the splines a short distance from the pulley sections attached thereto, said control mechanism including a cylindrical drum having one open end, one pulley section of each pair of pulley sections mounted on the portion of the splines located near the open end of the cylindrical drum having a frusto-conical sloping surface around one edge thereof, the adjoining pulley section of each pair of pulley sections located near the open end of the cylindrical drum, having a mating frusto-conical surface sloping in a direction opposite that of the adjoining pulley section of the pair, around the mating edge thereof, the sloping surfaces of each pair of pulley sections forming a V-belt groove therebetween, one pulley section of each pair of pulley sections mounted on the portion of the splines located at a greater distance from the control mechanism, near the outer end of the splines, having a sloping frusto-conical surface around the mating edge thereof sloping in a direction opposite that of the adjoining pulley section of the pair, the mating frusto-conical sloping surfaces of adjoining pulley sections forming V-belt grooves therebetween, a central pulley section integral with the larger diameter splines mounted on the angularly positioned splines between one pulley section, located between the central pulley section and the open end of the cylindrical drum, and one pulley section, located near the outer end of the splines, between the central pulley section and the outer end of the splines, the central pulley section having oppositely sloping frusto-conical surfaces on the opposite sides thereof, one sloping surface of the central pulley section combining with the mating sloping surface of the adjacent pulley section located near the control mechanism, to form a V-belt groove therebetween, one sloping surface of the central pulley section combining with the mating sloping surface of the adjacent pulley section located near the outer end of the splines to form a V-belt groove therebetween, means fixedly attaching a first set of pulley sections located near the control mechanism, and having sloping surfaces co-ordinated with those of the pulley sections attached to the other pairs of splines to form V-belt grooves therebetween to the larger diameter pair of splines, means fixedly attaching the mating pulley sections located near the control mechanism and having sloping surfaces co-ordinated with those of the pulley sections attached to the larger diameter pair of splines, to the angularly positioned pairs of splines, means fixedly attaching the first set of pulley sections located near the outer end of the splines, and having sloping faces angularly opposite those of the first group of pulley sections located near the control mechanism to the larger diameter pair of splines, means fixedly attaching a second group of pulley sections located near the outer end of the splines, and having sloping surfaces angularly opposite those of the second group of pulley sections located near the control mechanism, to the angularly positioned pairs of splines, the control means surrounding one end of said splines, consisting of a pair of tubular collars fitted to the outer circumference of the splines, means fixedly attaching one of said tubular collars to the larger diameter pair of splines, means fixedly attaching the other tubular collar of the pair to the angularly positioned pairs of splines, a pair of externally threaded sleeves surrounding the tubular collars, each of the externally threaded sleeves being adapted to slide longitudinally without rotating, while the mating tubular collar is rotated, a multiple-section internally threaded control member threadably fitted to the outer circumference of the sleeves, and means attached to the control member adapted to manually rotate the control member, the external threads on the sleeves being adapted to longitudinally move the collars attached thereto, and the pulley sections attached to said collars, relative to one another, by means of the respective pairs of splines, the longitudinal movement of the larger pair of splines in one direction, being substantially equal to the longitudinal movement of the angularly positioned pairs of splines in the opposite direction, the control means being adapted to simultaneously move the pulley sections mounted on the splines toward and away from one another to vary the width of the V-belt grooves, co-ordinated with the longitudinal movement of the respective splines to which they are attached, the mating pulley sections located near the open end of the cylindrical drum, being moved toward one another to reduce the width of the V-belt groove when the mating pulley sections mounted on the free portion of the splines located beyond the central pulley section, toward the free end of the splines, are moved away from one another to increase the width of the V-belt groove between the adjoining pulley sections.

5. An adjustable V-belt pulley mechanism comprising a cylindrical shaft, a plurality of pairs of splines fitted to the shaft and rotatable relative to the shaft, the splines consisting of a pair of splines of larger outside diameter than the others, and two pairs of splines angularly positioned relative to the larger diameter pair of splines, one spline of each angularly positioned pair being diametrically opposite the other, the angularly positioned pairs of splines being operatively attached to one another, a plurality of pairs of circular pulley sections mounted on the outer circumference of the splines, a control mechanism fitted to the splines a short distance from the pulley sections, selectively attached thereto, one pulley section of each pair mounted on the end of the splines located near the control mechanism, and directed toward the control mechanism, having a frusto-conical sloping surface around one edge thereof, the adjoining pulley section of each pair of pulley sections located near the control mechanism and having a mating frusto-conical surface sloping in a direction opposite that of the mating pulley sections of each pair around the mating edge thereof, one pulley section of each pair of pulley sections mounted on the portion of the tubular splines located at a greater distance from the control mechanism, near the outer end of the splines, having a sloping frusto-conical surface around one edge thereof, the adjoining pulley section of each pair of pulley sections located near the outer end of the splines, having sloping frusto-conical surface around the mating edge thereof sloping in a direction opposite that of the adjoining pulley section located near the outer end of the splines, the mating frusto-conical surfaces of each pair of adjoining pulley sections forming V-belt grooves therebetween, means fixedly attaching a first group of pulley sections having sloping surfaces co-ordinated with those of the pulley sections located near the control mechanism, and attached to the other pairs of splines to form V-belt grooves therebetween, to the larger diameter pair of splines, means fixedly attaching the second group of pulley sections located near the control mechanism, having sloping surfaces co-ordinated with those attached to the larger diameter splines, to the angularly positioned pairs of splines, means fixedly attaching the first group of pulley sections located at a greater distance from the control mechanism, near the outer end of the splines, the pulley sections having sloping surfaces angularly opposite those of the first pulley sections located near the control mechanism, to the larger diameter pairs of splines, means fixedly attaching the second group of pulley sections located near the outer end of the splines, and having sloping surfaces angularly opposite those of the first group of pulley sections located near the outer end of the splines, to the angularly positioned pairs of splines, a pair of tubular collars fitted to the outer circumference of the splines, means attaching the first of the tubular collars to the larger diameter pair of splines, means attaching the second tubular collar to the angularly positioned pairs of splines, an externally threaded sleeve supported by the first of said collars, a second externally threaded sleeve supported by the second tubular collar, the tubular collars being adapted to rotate relative to the respective sleeves, the first sleeve having left-hand external threads around the outer circumference thereof, the second sleeve having right-hand external threads around the outer circumference thereof, a control member consisting of two longitudinally aligned internally threaded tubular sections surrounding the outer circumference of the sleeves, the tubular control member sections having internal threads conforming in form and lead direction to the mating threads on the sleeves, and means attached to the tubular control member sections adapted to manually rotate the tubular control member, the external threads on the sleeves being adapted to move the mating pulley sections located near the open end of the hollow cylindrical drum, toward and away from one another to vary the widths of the V-belt grooves therebetween, the externally threaded sleeves being adapted to simultaneously move the pulley sections located beyond the central pulley section, toward the free end of the splines, in the opposite directions, away from and toward one another, to vary the width of the V-belt grooves between adjoining pulley sections, when the tubular control member is rotated.

6. An adjustable V-belt pulley mechanism comprising a cylindrical shaft, a plurality of pairs of splines fitted to the shaft and rotatable relative to the shaft, one spline of each pair being diametrically opposite the other, the splines consisting of a first pair of splines of an outside diameter larger than the others, and two pair of abutting splines angularly positioned relative to the first pair of splines, one spline or each pair being diametrically opposite the other, the angularly positioned pairs of splines being attached to one another, a plurality of pairs of circular pulley sections mounted on the outer circumference of the splines, a control mechanism fitted to the splines near some of the pulley sections and operatively attached thereto, one pulley section of each pair mounted on the portion of the splines located near, and directed toward the control mechanism, having a sloping frusto-conical surface around one edge thereof, the adjoining pulley section of each pair of pulley sections located near the control mechanism having a mating sloping frusto-conical surface around the mating edge thereof, in a direction opposite that of the adjoining pulley section of the pair, located near the control mechanism, one pulley section of each pair of pulley sections mounted on the outer portion of the splines at a greater distance from the control mechanism having a sloping frusto-conical surface around one edge thereof, the adjoining pulley section of each pair of pulley sections located near the outer end of the splines, and having a mating sloping frusto-conical surface around the mating edge thereof, sloping in a direction opposite that of the adjoining pulley section of each pair, located near the outer end of the splines, the frusto-conical sloping surfaces of each pair of pulley sections forming a V-belt groove therebetween, a central pulley section integral with the first larger diameter pair of splines mounted on the angularly positioned pairs of splines between one pulley section, located near the control mechanism, and one pulley section located near the outer end of the splines, the central pulley section having oppositely sloping frusto-conical surfaces around opposite sides thereof, one sloping surface of the central pulley section being coordinated with the mating sloping surface of the adjacent pulley section located near the control mechanism to form a V-belt groove therebetween, one sloping surface of the central pulley section combining with the mating sloping surface of the adjacent pulley section located near the outer end of the splines, to form a V-belt groove therebetween, means fixedly attaching the first set of pulley sections located near the control mechanism, having sloping surfaces facing in one direction to the first larger diameter pair of splines, means fixedly attaching the second set of mating pulley sections located near the outer end of the splines, and having oppositely sloping surfaces thereon, to the angularly positioned pairs of splines, means fixedly attaching the first group of pulley sections located near the outer end of the splines, and having sloping surfaces angularly opposite those of the first pulley sections located near the control mechanism, to the first larger diameter pair of splines, means fixedly attaching the second group of pulley sections located near the outer end of the splines, and having sloping surfaces angularly opposite those of the first group of pulley sections located near the outer end of the splines, to the angularly positioned pairs of splines, a pair of tubular collars fitted to the outer circumference of the splines, means attaching one of the tubular collars to the first larger diameter pair of splines, means attaching the second tubular collar to the mutually attached angularly positioned pairs of splines, an externally threaded sleeve supported by the first of said tubular collars, a second externally threaded sleeve supported by the second tubular collar, means fitted to the externally threaded sleeves adapted to restrain the rotation of the sleeves while the tubular collars are rotated, while allowing the sleeves to slide longitudinally, the first tubular sleeve having left-hand external threads around the outer circumference thereof, the second tubular sleeve having right-hand external threads around the outer circumference thereof, an internally threaded tubular control member surrounding the outer circumference of the externally threaded sleeves, the tubular control member having internal threads conforming in form and lead direction to the mating threads on the tubular sleeves, and means attached to the tubular control member adapted to manually rotate the tubular control member, the external threads on the sleeves being adapted to move the mating pulley sections mounted on the portion of the splines directed toward the open end of the drum, toward and away from one another to vary the widths of the V-belt grooves between adjoining pulley sections, the externally threaded sleeves being adapted to simultaneously move the pulley sections located beyond the central pulley section, toward the free end of the splines, in the opposite direction, away from and toward one another, to vary the width of the V-belt grooves between adjoining pulley sections, when the tubular control member is rotated.

7. An adjustable V-belt pulley mechanism comprising a cylindrical shaft, a plurality of pairs of splines fitted to the shaft and rotatable relative to the shaft, one spline of each pair being diametrically opposite the other, the splines consisting of a pair of splines having an outside diameter larger than the others, and two pairs of angularly abutting splines, angularly positioned relative to the larger diameter splines, the angularly positioned splines being operatively attached to one another, a plurality of pairs of circular pulley sections mounted on the outer circumference of the splines, a control mechanism fitted to the splines, selectively operatively attached to the splines, one pulley section of each pair mounted on the portion of the splines directed toward the control mechanism, having a frusto-conical sloping surface around one side thereof, the adjoining pulley section of each pair of pulley sections located near the control mechanism, having a mating sloping frusto-conical sloping surface on the side thereof facing the adjoining pulley section located near the control mechanism, the frusto-conical surface sloping in a direction opposite that of the adjoining pulley section located near the control mechanism, of each pair, one pulley section of each pair mounted on the outer portion of the splines located at a greater distance from the control mechanism, having a sloping frusto-conical surface on one side thereof, the adjoining pulley section of each pair of pulley sections located at a greater distance from the control mechanism near the outer end of the splines, having a mating sloping frusto-conical surface on the side thereof, facing the adjoining pulley section located near the outer end of the splines, the frusto-conical surface sloping in a direction opposite that of the adjoining pulley section of each pair, located near the outer end of the splines, the mating frusto-conical sloping surfaces of adjoining pulley sections forming V-belt grooves therebetween, a central pulley section integral with the larger diameter splines mounted on the outer circumference of the angular positioned splines, between one pulley section located near the control mechanism, and one pulley section located near the outer end of the splines, the central pulley section having oppositely sloping frusto-conical surfaces on opposite sides thereof, one sloping surface of the central pulley section combining with the mating sloping surface of the adjacent pulley section located near the control mechanism, to form a V-belt groove therebetween, one sloping surface of the central pulley section combining with the mating sloping surface of the adjacent pulley section located near the outer end of the splines, to form a V-belt groove therebetween, a first group of pulley sections located near the control mechanism, and having sloping surfaces facing in one direction being fixedly attached to the larger diameter pair of splines, the mating forwardly mounted pulley sections, having sloping surfaces facing in the opposite direction being fixedly attached to the angularly positioned pairs of splines, the first group of pulley sections located near the outer end of the splines, and having sloping surfaces opposite those of the first pulley sections located near the control mechanism, being fixedly attached to the larger diameter pair of splines, the second group of pulley sections located near the outer end of the splines, and being fixedly attached to the angularly positioned pairs of splines, a pair of tubular collars fitted to the outer circumference of the tubular splines, the first of the tubular collars being fixedly attached to the larger diameter pair of splines, the second tubular collar being fixedly attached to the angularly positioned pairs of splines, threaded means having threads in one direction fitted to the first of said tubular collars adapted to longitudinally slide the collar, a second threaded means having threads directed in the opposite direction fitted to the second of said tubular collars adapted to longitudinally slide the tubular collar in a direction opposite that of the first tubular collar, an internally threaded tubular control member having internal threads conforming in form and thread hand to the threaded means, threadably fitted to both threaded means, said control member being adapted to longitudinally slide both threaded means in opposite directions, when the tubular control member is rotated, and means fixedly connected to the cylindrical shaft slidably fitted to the first and second threaded means adapted to restrain the rotation of the threaded means when the mating tubular collars are rotated, while permitting the threaded means to slide longitudinally, said threaded means being adapted to move the mating pulley sections located near the open end of the hollow cylindrical drum, toward and away from one another to vary the widths of the V-belt grooves between adjoining pulley sections, said threaded means being adapted to simultaneously move the pulley sections located beyond the central pulley section toward the free end of the splines, in the opposite direction away from and toward one another, to vary the width of the V-belt grooves between adjoining pulley sections located beyond the central pulley section toward the free end of the splines, when the internally threaded tubular control member is manually rotated.

8. An adjustable V-belt pulley mechanism comprising a cylindrical shaft, a plurality of pairs of splines fitted to the shaft, and rotatable relative to the shaft, one spline of each pair being diametrically opposite the other, the splines consisting of a pair of splines, having an outside diameter larger than the others, and two pairs of angularly abutting splines, angularly positioned relative to the larger diameter pair of splines, the angularly positioned pairs of splines being operatively attached to one another, a plurality of pairs of circular pulley sections mounted on the outer circumference of the splines, a control mechanism fitted to the splines forward of the pulley sections selectively and operatively attached thereto, one pulley section of each pair mounted on the portion of the spines, directed toward the control mechanism, having a frusto-conical sloping surface around one side thereof, the adjoining pulley section of each pair of pulley sections located near the control mechanism, and having a mating sloping frusto-conical surface on the side thereof, facing the adjoining pulley section located near the control mechanism, the frusto-conical surface sloping in a direction opposite that of the adjoining pulley section of each pair, located near the control mechanism, one pulley section of each pair mounted on the outer portion of the splines located at a greater distance from the control mechanism, having a sloping frusto-conical surface on one side thereof, the adjoining pulley section of each pair of pulley sections located at a greater distance from the control mechanism, near the outer end of the splines, and having a mating sloping frusto-conical surface on the side thereof facing the adjoining pulley section located near the outer end of the splines, the frusto-conical surface sloping in a direction opposite that of the adjoining pulley section, located near the outer end of the splines, the mating frusto-conical surfaces of adjoining pulley sections forming V-belt grooves therebetween, a central pulley section integral with the larger diameter pair of splines mounted on the outer circumference of the angularly positioned pairs of splines between one pulley section located near the control mechanism and one pulley section located near the outer end of the splines, the central pulley section having oppositely sloping frusto-conical surfaces on opposite sides thereof, one sloping surface of the central pulley section being co-ordinated with the mating sloping surface of the adjacent pulley section located near the control mechanism, to form a V-belt groove therebetween, one sloping surface of the central pulley section combining with the mating sloping surface of the adjacent pulley section located near the outer end of the splines, to form a V-belt groove therebetween, the first group of pulley sections located near the control mechanism, having sloping surfaces facing in one direction being fixedly attached to the larger diameter pair of splines, the mating pulley sections located near the control mechanism, and having oppositely sloping surfaces being fixedly attached to the angularly positioned pairs of splines, the first group of pulley sections located near the outer end of the splines, and having sloping surfaces opposite those of the first pulley sections located near the control mechanism, and being fixedly attached to the larger diameter pair of splines, the second group of pulley sections located near the outer end of the splines, and having sloping surfaces angularly opposite those of the first group of pulley sections located near the outer end of the splines, and being fixedly attached to the angularly positioned pairs of splines, a pair of tubular collars fitted to the outer circumference of the splines, one of the tubular collars being fixedly attached to the larger diameter pair of splines, the second tubular collar being fixedly attached to the angularly positioned pairs of splines, a threaded sleeve having external threads, the thread of which is of one hand, fitted to the first of said tubular collars, a threaded sleeve having external threads, the thread of which is in the opposite direction to that fitted to the first tubular collar, fitted to the second of said tubular collars, a control member consisting of two longitudinally aligned internally threaded tubular sections fitted to both threaded sleeves, the internal threads in the control member sections conforming in form and thread direction to the externally threaded sleeves, said control member sections being adapted to longitudinally slide both threaded sleeves in opposite directions when the control member is rotated, a plurality of substantially cylindrical pins for restraining the rotation of the externally threaded sleeves when the control member is rotated, slidably fitted to the externally threaded sleeves, a plate fixedly supporting the pins mounted adjacent one tubular collar, means fixedly attaching the plate to the cylindrical shaft, a tubular drum surrounding the control member attached to the control member sections, a control wheel integral with the tubular drum, said externally threaded sleeves being adapted to move the mating pulley sections located near the control mechanism, toward and away from one another to vary the widths of the V-belt grooves between adjoining pulley sections, said externally threaded sleeves being adapted to simultaneously move the mating pulley sections located near the outer end of the splines, in the opposite direction, away from and toward one another, to vary the width of the V-belt grooves between adjoining rear mounted pulley sections, when the control wheel is manually rotated.

References Cited in the file of this patent

UNITED STATES PATENTS

| | | |
|---|---|---|
| 1,854,018 | Carlberg | Apr. 12, 1932 |
| 2,219,184 | Herman | Oct. 22, 1940 |
| 2,253,921 | Van Sant | Aug. 26, 1941 |
| 2,400,294 | Firth | May 14, 1946 |